(12) United States Patent
Liu et al.

(10) Patent No.: US 11,581,735 B2
(45) Date of Patent: Feb. 14, 2023

(54) METHOD AND APPARATUS FOR DYNAMICALLY CONTROLLING ELECTRICAL LOADS, STORAGE MEDIUM AND ELECTRONIC APPARATUS

(71) Applicant: Zhuhai Unitech Power Technology Co., Ltd., Guangdong (CN)

(72) Inventors: Yuehai Liu, Guangdong (CN); Shuqiang Jin, Gatineau (CA); Xiaoxiao Zhang, Guangdong (CN); Bobo Zhang, Guangdong (CN)

(73) Assignee: Zhuhai Unitech Power Technology Co., Ltd., Guangdong (CN)

( * ) Notice: Subject to any disclaimer, the term of this patent is extended or adjusted under 35 U.S.C. 154(b) by 0 days.

(21) Appl. No.: 17/043,747

(22) PCT Filed: Dec. 19, 2019

(86) PCT No.: PCT/CN2019/126740
§ 371 (c)(1),
(2) Date: Sep. 30, 2020

(87) PCT Pub. No.: WO2020/220699
PCT Pub. Date: Nov. 5, 2020

(65) Prior Publication Data
US 2022/0052527 A1    Feb. 17, 2022

(30) Foreign Application Priority Data

Apr. 28, 2019 (CN) .......................... 201910350925.1
Nov. 6, 2019 (CN) .......................... 201911077701.4

(51) Int. Cl.
G05F 1/66 (2006.01)
H02J 3/14 (2006.01)
G05B 15/02 (2006.01)

(52) U.S. Cl.
CPC .............. *H02J 3/144* (2020.01); *G05B 15/02* (2013.01); *G05F 1/66* (2013.01); *H02J 2310/22* (2020.01);
(Continued)

(58) Field of Classification Search
USPC ......................................................... 700/286
See application file for complete search history.

(56) References Cited

U.S. PATENT DOCUMENTS 6,891,478 B2 * 5/2005 Gardner .................... H02J 3/14
340/638
2010/0174418 A1   7/2010 Haugh
(Continued)

FOREIGN PATENT DOCUMENTS

CN     103971204 A    8/2014
CN     104113134 A    10/2014
(Continued)

*Primary Examiner* — Emilio J Saavedra
(74) *Attorney, Agent, or Firm* — Gang Yu

(57) ABSTRACT

Provided are a method and apparatus for dynamically controlling electrical loads, a storage medium and an electronic apparatus. The method includes that: a current capacity balance of a user sub-region is acquired from an intelligent electricity monitoring and metering terminal through a mobile terminal; when the current capacity balance is smaller than a load power of an electric consumption device to be started in the user sub-region, a regional coordination control apparatus or a server is requested through the mobile terminal to adjust and increase a capacity allocated for the user sub-region, such that a capacity balance will be greater than or equal to the load power; and whether to allow to start the electric consumption device is determined according to a decision replied by the regional coordination control apparatus or the server.

21 Claims, 4 Drawing Sheets

(52) U.S. Cl.
CPC ........... *H02J 2310/58* (2020.01); *Y02B 70/30* (2013.01); *Y04S 20/00* (2013.01)

(56) References Cited

U.S. PATENT DOCUMENTS

| | | | |
|---|---|---|---|
| 2010/0332373 A1* | 12/2010 | Crabtree | G06Q 40/04 709/224 |
| 2012/0150359 A1* | 6/2012 | Westergaard | G06Q 30/0202 700/291 |
| 2014/0330532 A1* | 11/2014 | Simmons | G01R 21/00 702/60 |

FOREIGN PATENT DOCUMENTS

| | | | | |
|---|---|---|---|---|
| CN | 104917173 A | | 9/2015 | |
| CN | 105098979 A | | 11/2015 | |
| CN | 105552885 A | | 5/2016 | |
| CN | 107123986 A | * | 9/2017 | ....... G06Q 10/06312 |
| CN | 107123986 A | | 9/2017 | |
| CN | 109038626 A | | 12/2018 | |

* cited by examiner

METHOD AND APPARATUS FOR DYNAMICALLY CONTROLLING ELECTRICAL LOADS, STORAGE MEDIUM AND ELECTRONIC APPARATUS

TECHNICAL FIELD

The disclosure relates to the power field, and in particular to a method and apparatus for dynamically controlling electrical loads, a storage medium and an electronic apparatus.

BACKGROUND

In the relevant art, conventional methods for allocating and managing a distribution capacity include: static allocation, i.e., all users depend on a switch tripper for overload trip control as per designed and uniformly allocated capacities; and once an electrical load exceeds a standard distribution capacity, the trip is caused. In most cases, some users do not use up the allocated electricity, there still remains a large amount of total capacity in regions, and users with excessive electricity requirements cannot use the remained capacity, such that the utilization rate of power supply devices and power consumption efficiency are not high, the power utilization experience of the user is affected, and a lot of idle capacity limits of devices cannot be optimally reallocated for full utilization.

In addition, the orderly power utilization relies on a manual power rationing manner or a load control terminal for rationed trip. Only the total capacity is able to be limited and the inside loads cannot be controlled; and in case of an overload, the whole region is powered off. The user interaction is insufficient, the internal power utilization is unclear, the power utilization management of each device is orderless, the operation is random, and the total load is limited in a single manner, such that the overload trip is easily caused to interrupt power supplies of all devices.

Moreover, the demand-side management excessively depends on the participation of the users. It is demanding on a load type, an electricity environment and an infrastructure, and further requires the users to keep a high demand-side management awareness. Meanwhile, the demand-side management neither effectively controls a start behavior of a user device nor effectively copes with the rapid rise of a load, which may lead to the overload trip of the total load.

Concerning the problems that the regional electricity control method has low utilization rate of power supply devices and low power consumption efficiency, is prone to the overload trip and the like in the relevant art, effective solutions haven't been pushed forward yet.

SUMMARY

Embodiments of the disclosure provide a method and apparatus for dynamically controlling electrical loads, a storage medium and an electronic apparatus, to at least solve the problems that the regional electricity control method has low utilization rate of power supply devices and low power consumption efficiency, is prone to overload trip and the like in the relevant art.

According to an embodiment of the disclosure, a method for dynamically controlling electrical loads is provided, which may include that: a current capacity balance of a user sub-region is acquired from an intelligent electricity monitoring and metering terminal through a mobile terminal; when the current capacity balance is smaller than a load power of an electric consumption device to be started in the user sub-region, a regional coordination control apparatus or a server is requested through the mobile terminal to adjust the user sub-region to increase a capacity allocated for the user sub-region, such that a capacity balance will be greater than or equal to the load power; and whether to allow to start the electric consumption device is determined according to a decision replied by the regional coordination control apparatus or the server.

According to another embodiment of the disclosure, an apparatus for dynamically controlling electrical loads is provided, which may include: an acquisition module, configured to acquire a current capacity balance of a user sub-region from an intelligent electricity monitoring and metering terminal through a mobile terminal; a request module, configured to request, when the current capacity balance is smaller than a load power of an electric consumption device to be started in the user sub-region, a regional coordination control apparatus or a server through the mobile terminal to adjust the user sub-region to increase a capacity allocated for the user sub-region, such that a capacity balance will be greater than or equal to the load power; and a determination module, configured to determine whether to allow to start the electric consumption device according to a decision replied by the regional coordination control apparatus or the server.

According to still another embodiment of the disclosure, a storage medium is also provided. The storage medium stores a computer program, and the computer program is configured to run to execute any step in the method embodiment.

According to still another embodiment of the disclosure, an electronic apparatus is also provided, which may include a memory and a processor. The memory stores a computer program, and the processor is configured to run the computer program to execute any step in the method embodiment.

By means of the disclosure, when the current capacity balance of the user sub-region is smaller than the load power of the electric consumption device to be started in the user sub-region, the regional coordination control apparatus or the server is requested through the mobile terminal to adjust and increase the capacity allocated for the user sub-region, such that a capacity balance will be greater than or equal to the load power, and thus whether to allow to start the electric consumption device is determined according to the decision replied by the regional coordination control apparatus or the server. With the adoption of the above technical solutions, the problems that the regional electricity control method has low utilization rate of power supply devices and low power consumption efficiency, is prone to overload trip and the like in the relevant art are solved; and for the electric consumption device of which the current capacity balance cannot meet the load power, the regional coordination control apparatus or the server is able to be flexibly requested through the mobile terminal to adjust and increase the capacity allocated for the user sub-region, such that the capacity balance will be greater than or equal to the load power, thereby improving the power consumption efficiency and avoiding the overload trip.

BRIEF DESCRIPTION OF THE DRAWINGS

The accompanying drawings are described here to provide a further understanding of the disclosure, and form a part of the disclosure. The schematic embodiments and description of the disclosure are adopted to explain the disclosure, and do not form improper limits to the disclosure. In the drawings.

DETAILED DESCRIPTION OF THE EMBODIMENTS

The disclosure is described below in detail with reference to the accompanying drawings and in combination with the embodiments. It is to be noted that the embodiments of the disclosure and the characteristics of the embodiments may be combined with each other if there is no conflict.

It should be noted that, terms such as "first" and "second" in the specification, claims and accompanying drawings of the disclosure are only used to distinguish similar objects, rather than to describe a special order or a precedence order.

Embodiment 1

Figure 1:
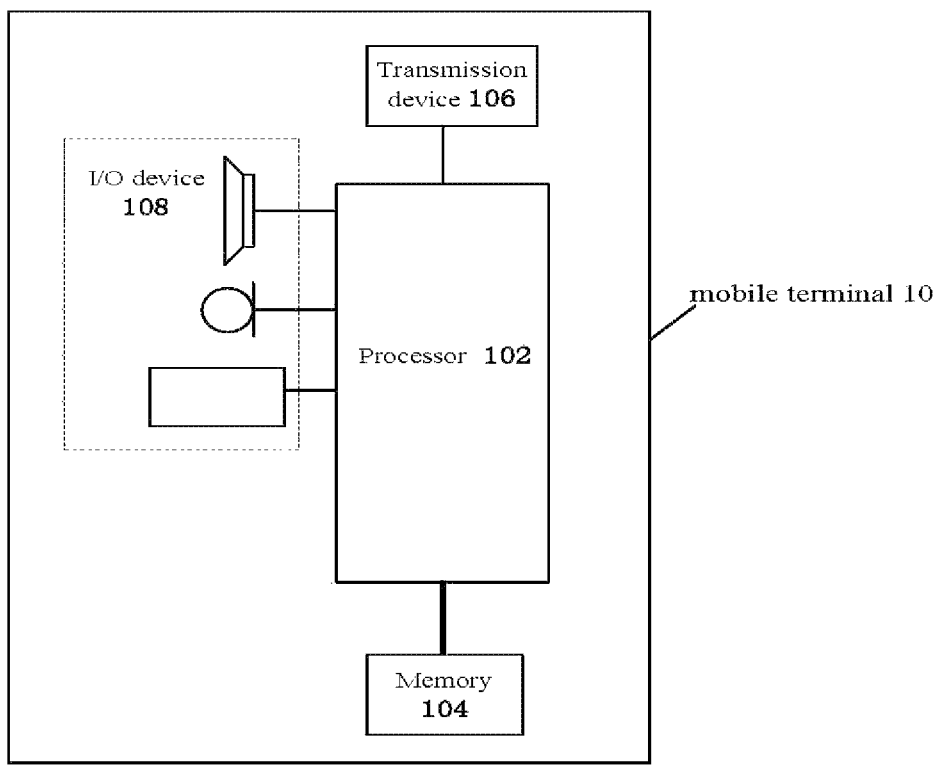
FIG. 1 is a structural block diagram of hardware of a mobile terminal of a method for dynamically controlling electrical loads according to an embodiment of the disclosure.

The method embodiment provided by Embodiment 1 of the disclosure may be executed in a mobile terminal, a computer terminal or a similar operation apparatus. With a case running on the mobile terminal as the example, FIG. 1 is a structural block diagram of hardware of a mobile terminal of a method for dynamically controlling electrical loads according to an embodiment of the disclosure. As shown in FIG. 1, the mobile terminal 10 may include one or more (only one is illustrated in the FIG. 1) processors 102 (the processor 102 may include, but not limited to, a processing apparatus such as a Micro Control Unit (MCU) or a Field Programmable Gate Array (FPGA)), and a memory 104 configured to store data. Optionally, the mobile terminal may further include a transmission device 106 for a communication function, and an Input/Output (I/O) device 108. Those of ordinary skill in the art may understand that the structure shown in FIG. 1 is merely for illustration, rather than a limit to the above structure of the mobile terminal. For example, the mobile terminal 10 may further include more or less components shown in FIG. 1, or have a function same as FIG. 1 or have more different configurations than FIG. 1.

The memory 104 may be configured to store a computer program, such as a software program and a module of application software, and a computer program corresponding to a method for dynamically controlling electrical loads in the embodiments of the disclosure. The processor 102 runs the computer program stored in the memory 104 to execute various functional applications as well as data processing, that is, to implement the above method. The memory 104 may include a high-speed random access memory and may also include a nonvolatile memory, for example, one or more magnetic storage devices, flash memories or other nonvolatile solid-state memories. In some examples, the memory 104 may further include a memory remotely disposed relative to the processor 102; and these remote memories may be connected to the mobile terminal 10 via a network. An example of the network includes, but not limited to, the Internet, an intranet, a local area network, a mobile communication network and a combination thereof.

The transmission device 106 is configured to receive or send data through a network. A specific example of the network may include a wireless network provided by a communication supplier of the mobile terminal 10. In an example, the transmission device 106 includes a Network Interface Controller (NIC) that may be connected to other network devices via a base station to communicate with the Internet. In an example, the transmission device 106 may be a Radio Frequency (RF) module that is configured to communicate with the Internet via a wireless manner.

Figure 5:
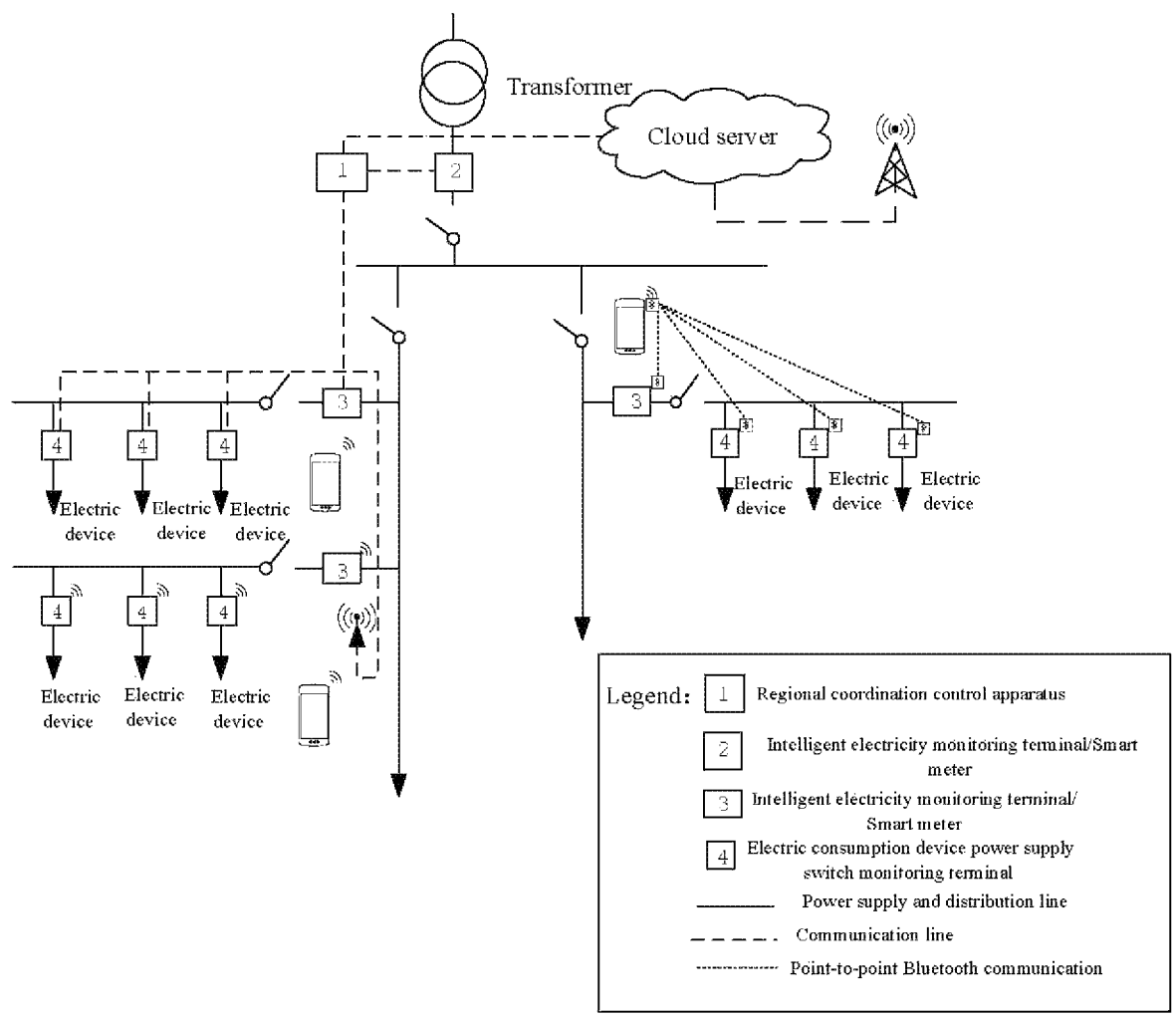
FIG. 5 is a structural schematic diagram of a system for dynamically controlling electrical loads according to an embodiment of the disclosure.

The embodiment of the disclosure may run on a network architecture shown in FIG. 5, As shown in FIG. 5, the network architecture includes: a cloud server (equivalent to a server), a regional coordination control apparatus, an intelligent electricity monitoring terminal/a smart meter (equivalent to an intelligent electricity monitoring and metering terminal), an electric consumption device power supply switch monitoring terminal (equivalent to a power supply switch monitoring terminal), and a mobile terminal.

Figure 2:
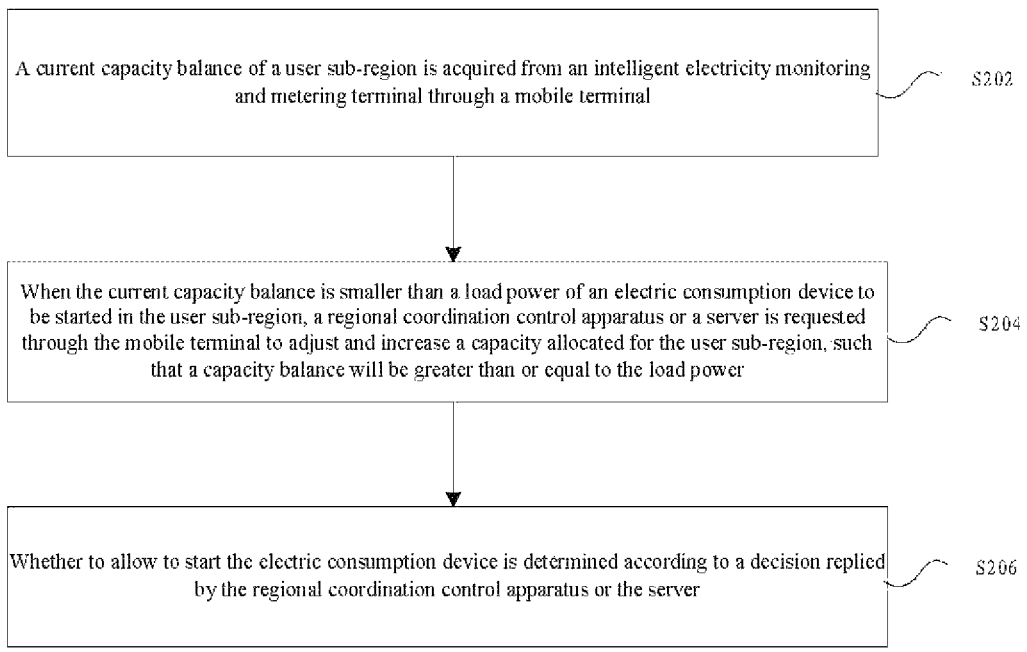
FIG. 2 is a flowchart of a method for dynamically controlling electrical loads according to an embodiment of the disclosure.

The embodiment provides a method for dynamically controlling electrical loads that runs on the mobile terminal. FIG. 2 is a flowchart of a method for dynamically controlling electrical loads according to an embodiment of the disclosure. As shown in FIG. 2, the process may include the following steps.

step S202, a current capacity balance of a user sub-region is acquired from an intelligent electricity monitoring and metering terminal through a mobile terminal.

It is to be noted that the "user sub-region" in the embodiment of the disclosure may be understood as a region where is monitored by the intelligent electricity monitoring and metering terminal, and the "current capacity balance" may be understood as a load power that is able to be born except for the current load in the current electric sub-region of the user.

step S204, when the current capacity balance is smaller than a load power of an electric consumption device to be started in the user sub-region, a regional coordination control apparatus or a server is requested through the mobile terminal to adjust and increase a capacity allocated for the user sub-region, such that a capacity balance will be greater than or equal to the load power.

Upon the determination that the current capacity balance is greater than or equal to the load power of the electric consumption device to be started, it is allowed to start the electric device.

step S206, whether to allow to start the electric consumption device is determined according to a decision replied by the regional coordination control apparatus or the server.

By means of the above steps, when the current capacity balance of the user sub-region is smaller than the load power of the electric consumption device to be started in the user sub-region, the regional coordination control apparatus or the server is requested through the mobile terminal to adjust and increase the capacity allocated for the user sub-region, such that a capacity balance will be greater than or equal to the load power, and thus whether to allow to start the electric consumption device is determined according to the decision replied by the regional coordination control apparatus or the server. With the adoption of the above technical solutions, the problems that the regional electricity control method has low utilization rate of power supply devices and low power consumption efficiency, is prone to overload trip and the like in the relevant art are solved; and for the electric consumption device of which the current capacity balance cannot meet the load power, the regional coordination control apparatus or the server is able to be flexibly requested through the mobile terminal to adjust and increase the capacity allocated for the user sub-region, such that the capacity balance will be greater than or equal to the load power, thereby improving the electricity power consumption efficiency and avoiding the overload trip.

Optionally, the execution main body of the above steps may be the mobile terminal and the like but is not limited thereto.

In step S204, with the result that the regional coordination control apparatus or the server is requested through the mobile terminal to adjust and increase the capacity allocated for the user sub-region, although the current capacity balance is greater than or equal to the load power, the considerations need to be further taken to that the increased capacity cannot exceed a maximum allowable capacity limit in the master switch circuit of the user.

Step S206 has many implementation manners as a matter of fact. In an optional embodiment, this step may be implemented in the following manner: when the decision indicates that an additional allocation capacity for adjusting and increasing the capacity is acquired for the user sub-region (for example, if the original capacity balance is 10 kW, from 10 kW to 15 kW, the net increase of 5 kW may be understood as the additional allocation capacity), whether to allow to start the electric consumption device is determined. In an optional embodiment, the device may be directly started. It is also possible to merely notify or prompt the user of starting the device. In such a case, whether to start the device subsequently is determined by the user. When the decision indicates that the additional allocation capacity is not acquired for the user sub-region for adjusting and increasing the capacity, it is forbidden to start the electric device. That is, if the regional coordination control apparatus or the server indicates that the capacity is able to be adjusted and increased for the user sub-region at present, it is allowed to start the electric device; and if the capacity cannot be adjusted and increased for the user sub-region, it is forbidden to start the electric device. During actual operation, in order to increase the safety of the operation, the method may further include that: a capacity limit of a power supply switch monitoring terminal of the electric consumption device is updated; and then a prompt is given to start the electric device; or, after the additional allocation capacity of the regional coordination control apparatus or the server for adjusting and increasing the capacity is acquired, the intelligent electricity monitoring and metering terminal is notified of updating a capacity limit of the user sub-region, and updating the capacity limit of the power supply switch monitoring terminal of the electric device, and then the prompt is given to start the electric device.

Specifically, a request for requesting to adjust and increase the capacity allocated for the user sub-region is sent to the regional coordination control apparatus or the server through the mobile terminal, so as to request to acquire a predetermined capacity of additional allocation capacity for the user sub-region; and the decision determined by the regional coordination control apparatus or the server in the following manner is received through the mobile terminal: the regional coordination control apparatus or the server determines whether to increase the capacity allocated for the user sub-region according to a difference between a current total capacity limit of total regions and a total load of the total regions, wherein when the difference between the current total capacity limit and the total load is greater than or equal to the additional allocation capacity, the regional coordination control apparatus or the server is able to adjust and increase the capacity allocated for the user sub-region, and when the difference between the current total capacity limit and the total load is smaller than the additional allocation capacity, the regional coordination control apparatus or the server cannot adjust and increase the capacity allocated for the user sub-region.

Optionally, the intelligent electricity monitoring and metering terminal is notified through the mobile terminal of requesting the regional coordination control apparatus or the server to adjust and increase the capacity allocated for the user sub-region; or the regional coordination control apparatus or the server is requested to adjust and increase the capacity allocated for the user sub-region by the intelligent electricity monitoring and metering terminal actively, when it detects that a load is out-of-limit or trends to be out-of-limit.

The following technical solutions in the embodiment of the disclosure provide several implementation manners to request the regional coordination control apparatus or the server through the mobile terminal to adjust and increase the capacity allocated for the user sub-region.

1) When the current capacity balance is insufficient, the regional coordination control apparatus or the server is applied through the mobile terminal automatically in real time to adjust and increase the capacity allocated for the user sub-region, i.e., as long as determining that the current capacity balance is not sufficient to the load power of the electric device, the mobile terminal automatically applies to the regional coordination control apparatus or the server in real time, that is, the mobile terminal determines, in real time, whether the current capacity balance is insufficient (the total load of the user is overloaded or trends to be overloaded or is to be overloaded once the electric consumption device is started), and the additional allocation capacity is automatically applied for, to the regional coordination control apparatus or the cloud server without manual intervention.

2) A prompt on whether to apply is given through the mobile terminal, and upon the receipt of a confirmative instruction, the regional coordination control apparatus or the server is requested through the mobile terminal to adjust and increase the capacity allocated for the user sub-region, i.e., upon the determination that the user needs to apply for adjusting and increasing the capacity, the system gives a prompt to the user on whether to apply for the additional allocation capacity, and the regional coordination control apparatus or the server is applied for the additional allocation capacity after manual intervened confirmation.

3) A manual retry is made through the mobile terminal to request the regional coordination control apparatus or the server to adjust and increase the capacity allocated for the user sub-region, i.e., if the application is refused by the regional coordination control apparatus or the cloud server (for example, the remaining capacity of the region at the present moment is insufficient to start the electric device), the user may manually retry the application (for multiple times) in different time (or after some electric devices are closed), till the remaining capacity of the user or the region is sufficient and the application is approved.

4) An automatic retry is made according to a first period through the mobile terminal or the intelligent electricity monitoring and metering terminal (other execution main bodies are also appropriate and there are no limits thereto in the embodiment of the disclosure) to request the regional coordination control apparatus or the server to adjust and increase the capacity allocated for the user sub-region, i.e., in some scenarios, it is appropriate that when determining that the user needs to apply for the additional allocation capacity repeatedly (for example, the user sets to retry automatically), the system applies for the additional allocation capacity automatically and repeatedly instead of the manual retry.

5) Time is appointed in advance through the mobile terminal, and when appointment time arrives, the regional coordination control apparatus or the server is requested to adjust and increase the capacity allocated for the user sub-region, or when the appointment time arrives, a capacity reserved for the user sub-region and meeting a capacity adjustment and increase request is acquired, i.e., the user may apply for the additional allocation capacity in a manner of appointing the time, for example, the system automatically applies for the additional allocation capacity at the appointment time, or the system reserves a capacity meets the additional allocation capacity applied by the user for allocating at the appointment time.

Further, when the total regions have an overload, or the total regions have an insufficient capacity balance, the additional allocation capacity acquired by the capacity adjustment and increase request is withdrawn through the regional coordination control apparatus or the server; or, the additional allocation capacity acquired by the capacity adjustment and increase request is actively withdrawn through the intelligent electricity monitoring and metering terminal.

The following technical solutions in the embodiment of the disclosure further provide several technical solutions for withdrawing the additional allocation capacity acquired by the capacity adjustment and increase request.

1) A withdrawing instruction sent by the regional coordination control apparatus or the server is received by the intelligent electricity monitoring and metering terminal; and under the indication of the withdrawing instruction, the additional allocation capacity acquired by the capacity adjustment and increase request is withdrawn, i.e., when the regional load is overhigh or the capacity balance is insufficient, the regional coordination control apparatus or the cloud server sends the capacity withdrawing instruction to the intelligent electricity monitoring and metering terminal, and the intelligent electricity monitoring and metering terminal withdraws the previously-applied additional allocation capacity within a certain time (the capacity is reduced to a normal value).

2) The additional allocation capacity acquired by the capacity adjustment and increase request is withdrawn automatically on timer, i.e., the system withdraws the additional allocation capacity of the relevant terminal when a set time expires.

3) After it is detected that the load of the user sub-region is reduced to a predetermined value for predetermined time, the additional allocation capacity acquired by the capacity adjustment and increase request is withdrawn, i.e., the intelligent electricity monitoring and metering terminal withdraws the previously-applied additional allocation capacity after detecting that the load is reduced to a set value or below for a certain time (the capacity is reduced to the normal value).

4) When an appointment period expires, the additional allocation capacity acquired by the capacity adjustment and increase request is withdrawn, i.e., when the valid period expires, the system withdraws the additional allocation capacity of the relevant terminal (or the terminal automatically withdraws the additional allocation capacity).

5) Before execution of withdrawing the additional allocation capacity acquired by the capacity adjustment and increase request, a confirming to execute the withdrawing is prompted, and if yes, the operation of withdrawing the additional allocation capacity acquired by the capacity adjustment and increase request is executed, which may also be understood as before the execution of withdrawing the additional allocation capacity acquired by the capacity adjustment and increase request, whether to continuously allow a start state of the electric consumption device of the heavy load power is prompted to the user, if yes, the additional allocation capacity is not withdrawn, and if no, the operation of withdrawing the additional allocation capacity acquired by the capacity adjustment and increase request is executed.

In the embodiment of the disclosure, upon the determination that the current capacity balance is smaller than the load power of the electric consumption device to be started, the method may further include that: at least one of the following interlock manners is executed: soft interlock; and quasi-interlock. In the soft interlock manner, when the power supply switch monitoring terminal of the electric consumption device does not acquire capacity authorization, it is forbidden to remotely control and switch on the power supply switch. In the quasi-interlock manner, when the power supply switch monitoring terminal of the electric consumption device does not acquire the capacity authorization, and when closing the power supply switch manually, the power supply switch cannot be switched on or will trip immediately after being switched on. At this time, even though somebody want to close the switch, the switch will not be pushed in place or cannot be buckled and kept, the inside (a contact) of the switch is not switched on and cannot form a loop. Further, upon the determination that the current capacity balance is greater than or equal to the load power of the electric consumption device to be started, the power supply switch monitoring terminal of the electric consumption device unlocks automatically; and when it is determined through the power supply monitoring terminal of the electric consumption device that the current capacity balance is smaller than the load power of the electric consumption device to be started, the power supply switch monitoring terminal of the electric consumption device locks automatically.

The embodiment of the disclosure further provides technical solutions for authorizing an additional allocation capacity in advance, i.e., before the current capacity balance of the user sub-region is acquired from the intelligent electricity monitoring and metering terminal through the mobile terminal, the method may further include that: when the difference between the current total capacity limit of the total regions and the total load of the total region is greater than or equal to the additional allocation capacity, whether to adjust and increase the capacity allocated for the user sub-region is at least determined in one of the following manners: whether to adjust and increase the capacity allocated for the user sub-region is determined in real time by the regional coordination control apparatus or the server (i.e., as long as the capacity balance of the total regions is sufficient, actively, the intelligent electricity monitoring and metering terminal is authorized to acquire the additional allocation capacity); whether to adjust and increase the capacity allocated for the user sub-region is actively determined according to a load tendency and a historical load regular pattern of the total regions, and a certain margin may be kept; and whether to adjust and increase the capacity allocated for the user sub-region is determined according to a user load tendency and a historical user load regular pattern of the user sub-region, and thus when the user may need to adjust and increase the capacity, the additional allocation capacity is actively authorized.

Based on the above technical solutions, in the embodiment of the disclosure, the electric consumption device is at least started in one of the following manners: the power supply switch of the electric consumption device is switched on through the mobile terminal; a prompt is given through the mobile terminal to the user of switching on the power supply switch of the electric consumption device manually; and the electric consumption device is directly started through the mobile terminal.

In the embodiment of the disclosure, the method may further include that: a current power transmission path of a controllable electrical device (the electrical load in the user sub-region may be viewed as the controllable electrical device) is identified; an available power resource of power supply and distribution devices on the power transmission path is acquired, the available power resource being at least configured to indicate one of the followings: a capacity balance of these power supply and distribution devices, and a distributable power range of these power supply and distribution devices; and a control boundary of the controllable electrical device is determined according to the available power resource.

By means of the disclosure, the available power resource of these power supply and distribution devices on the identified current power transmission path of the controllable electrical device is acquired, and the control boundary of the controllable electrical device is determined according to the available power resource, the available power resource being at least configured to indicate one of the followings: the capacity balance of these power supply and distribution devices, and the distributable power range of these power supply and distribution devices. With the adoption of the above technical solutions, the problems that the controllable electrical device is out-of-order to utilize the electricity, the peak-valley phenomenon is obvious, the supply reliability of the power grid is low and the like in the relevant art are solved; and then, the control boundary of the controllable electrical device is able to be determined according to the capacity balance and/or the distributable power range of these power supply and distribution devices on the current power transmission path, which is helpful to shift the peak load and fill the valley, and is of great significance to lower the system risk of the power grid and improve the operation benefit and reliability of the power grid.

In an optional embodiment, the following technical solutions may be used for implementation: a topological structure of a regional electrical system diagram corresponding to the controllable electrical device, and/or a power flow source direction of the controllable electrical device, is acquired; and the power transmission path is determined according to the topological structure, and/or the power flow source direction. That is, in the embodiment of the disclosure, the power transmission path may be determined in at least one of the followings: the topological structure of the regional electrical system diagram, and the power flow source direction.

In the embodiment of the disclosure, the operation that the control boundary of the controllable electrical device is determined according to the available power resource may include the following operations.

1) In a case where the available power resource indicates the capacity balance, an upper limit of an increasable load of the controllable electrical device is determined according to the capacity balance.

Specifically, the operation that the upper limit of the increasable load of the controllable electrical device is determined according to the capacity balance may be implemented in the following technical solutions: a minimum capacity balance in multiple capacity balances of multiple power supply and distribution devices is acquired; and the minimum capacity balance is determined as the upper limit of the increasable load of the controllable electrical device.

2) In a case where the available power resource indicates the distributable power range, a range of an adjustable load of the controllable electrical device is determined according to the distributable power range.

Specifically, the operation that the range of the adjustable load of the controllable electrical device is determined according to the distributable power range may be implemented in the following technical solutions: multiple distributable power ranges of multiple power supply and distribution devices are acquired; and a power range corresponding to an intersection of the multiple distributable power ranges is determined as the range of the adjustable load of the controllable electrical device.

In the above manner for acquiring the available power resource, the available power resource may be determined according to power supply and distribution capacities and current loads of these power supply and distribution devices. The power supply and distribution capacity of the power supply and distribution device may be at least determined according to one of the followings: a rated capacity of the power supply and distribution device, a rated current, a voltage, a setting value of power relay protection, a power consumption control target value from superior power dispatch center, a dynamic load control limit, and a load operation range set by the user.

By means of the above-mentioned descriptions on the implementation manner, the person skilled in the art may clearly understand that the disclosure may be implemented by software plus a necessary universal hardware platform, and may also be implemented by hardware certainly, but under most conditions, the former is a better implementation manner. Based on such an understanding, the technical solutions of the disclosure essentially, or the part contributing to the conventional art may be implemented in a form of a software product. The computer software product is stored in a storage medium (such as a Read Only Memory (ROM)/Random Access Memory (RAM), a magnetic disk, and an optical disc) and includes a plurality of instructions for instructing a terminal device (which may be a mobile phone, a computer, a server, or a network device, etc.) to execute the methods described in the embodiments of the disclosure.

Embodiment 2

The embodiment further provides an apparatus for dynamically controlling electrical loads for implementing the above-mentioned embodiments and preferred implementation manners. A content that has been described will no longer be repeated. As used below, the term "module" may implement a combination of software and/or hardware having a predetermined function. Although the apparatus described in the following embodiments is implemented by software preferably, the implementation of hardware or a combination of the software and the hardware may also be conceivable.

Figure 3:
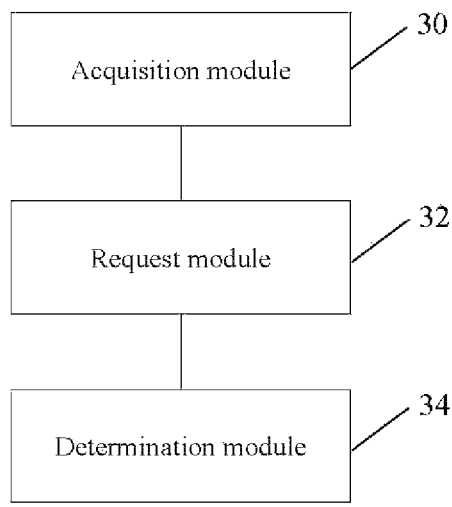
FIG. 3 is a structural block diagram of an apparatus for dynamically controlling electrical loads according to an embodiment of the disclosure.

FIG. 3 is a structural block diagram of an apparatus for dynamically controlling electrical loads according to an embodiment of the disclosure. As shown in FIG. 3, the apparatus may include: an acquisition module 30, a request module 32 and a determination module 34.

The acquisition module 30 is configured to acquire a current capacity balance of a user sub-region from an intelligent electricity monitoring and metering terminal through a mobile terminal.

The request module 32 is configured to request, when the current capacity balance is smaller than a load power of an electric consumption device to be started in the user sub-region, a regional coordination control apparatus or a server through the mobile terminal to adjust and increase a capacity allocated for the user sub-region, such that the capacity balance will be greater than or equal to the load power.

The determination module 34 is configured to determine whether to allow to start the electric consumption device according to a decision replied by the regional coordination control apparatus or the server.

By means of the technical solutions of the disclosure, when the current capacity balance of the user sub-region is smaller than the load power of the electric consumption device to be started in the user sub-region, the regional coordination control apparatus or the server is requested through the mobile terminal to adjust and increase the capacity allocated for the user sub-region, such that the capacity balance will be greater than or equal to the load power, and thus whether to allow to start the electric consumption device is determined according to the decision replied by the regional coordination control apparatus or the server. With the adoption of the above technical solutions, the problems that the regional electricity control method has low utilization rate of power supply devices and low power consumption efficiency, is prone to overload trip and the like in the relevant art are solved; and for the electric consumption device of which the current capacity balance cannot meet the load power, the regional coordination control apparatus or the server is able to be flexibly requested through the mobile terminal to adjust and increase the capacity allocated for the user sub-region, such that the capacity balance will be greater than or equal to the load power, thereby improving the power consumption efficiency and avoiding the overload trip.

Optionally, the determination module 34 is further configured to allow to start the electric consumption device when the decision indicates that the user sub-region acquires an additional allocation capacity for adjusting and increasing the capacity; and forbid to start the electric consumption device when the decision indicates that the user sub-region does not acquire the additional allocation capacity for adjusting and increasing the capacity.

Upon the determination that the current capacity balance is greater than or equal to the load power of the electric consumption device to be started, the electric consumption device is started.

Optionally, with the result that the regional coordination control apparatus or the server is requested through the mobile terminal to adjust and increase the capacity allocated for the user sub-region, although the current capacity balance is greater than or equal to the load power, the considerations need to be further taken to that the increased capacity cannot exceed a maximum allowable capacity limit in the master switch circuit of the user.

During actual operation, in order to increase the safety of the operation, before the electric consumption device is started, the method may further include that: a capacity limit of a power supply switch monitoring terminal of the electric consumption device is updated; and then a prompt is given to start the electric device; or, after the additional allocation capacity of the regional coordination control apparatus or the server for adjusting and increasing the capacity is acquired, the intelligent electricity monitoring and metering terminal is notified of updating a capacity limit of the user sub-region, and updating the capacity limit of the power supply switch monitoring terminal of the electric device, and then the prompt is given to start the electric device.

Specifically, the request module 32 is further configured to send a request for requesting to adjust and increase the capacity allocated for the user sub-region to the regional coordination control apparatus or the server through the mobile terminal, so as to request to acquire a predetermined capacity of additional allocation capacity for the user sub-region; and the decision determined by the regional coordination control apparatus or the server in the following manner is received through the mobile terminal: the regional coordination control apparatus or the server determines whether to increase the capacity allocated for the user sub-region according to a difference between a current total capacity limit of total regions and a total load of the total regions, wherein when the difference between the current total capacity limit and the total load is greater than or equal to the additional allocation capacity, the regional coordination control apparatus or the server is able to adjust and increase the capacity allocated for the user sub-region, and when the difference between the current total capacity limit and the total load is smaller than the additional allocation capacity, the regional coordination control apparatus or the server cannot adjust and increase the capacity allocated for the user sub-region.

Optionally, the intelligent electricity monitoring and metering terminal is notified through the mobile terminal of requesting the regional coordination control apparatus or the server to adjust and increase the capacity allocated for the user sub-region; or the regional coordination control apparatus or the server is requested to adjust and increase the capacity allocated for the user sub-region by the intelligent electricity monitoring and metering terminal actively, when it detects that a load is out-of-limit or trends to be out-of-limit.

The following technical solutions in the embodiment of the disclosure provide several implementation manners to request the regional coordination control apparatus or the server through the mobile terminal to adjust and increase the capacity allocated for the user sub-region.

1) When the current capacity balance is insufficient, the regional coordination control apparatus or the server is applied through the mobile terminal automatically in real time to adjust and increase the capacity allocated for the user sub-region, i.e., as long as determining that the current capacity balance is not sufficient to the load power of the electric device, the mobile terminal automatically applies to the regional coordination control apparatus or the server in real time, that is, the mobile terminal determines, in real time, whether the current capacity balance is insufficient (the total load of the user is overloaded or trends to be overloaded or is to be overloaded once the electric consumption device is started), and the additional allocation capacity is automatically applied for, to the regional coordination control apparatus or the cloud server without manual intervention.

2) A prompt on whether to apply is given through the mobile terminal, and upon the receipt of a confirmative instruction, the regional coordination control apparatus or the server is requested through the mobile terminal to adjust and increase the capacity allocated for the user sub-region, i.e., upon the determination that the user needs to apply for adjusting and increasing the capacity, the system gives a prompt to the user on whether to apply for the additional allocation capacity, and the regional coordination control apparatus or the server is applied for the additional allocation capacity after manual intervened confirmation.

3) A manual retry is made through the mobile terminal to request, the regional coordination control apparatus or the server to adjust and increase the capacity allocated for the user sub-region, i.e., if the application is refused by the regional coordination control apparatus or the server (for example, the remaining capacity of the region at the present moment is insufficient to start the electric device), the user may manually retry the application (for multiple times) in different time (or after some electric devices are closed), till the remaining capacity of the user or the region is sufficient and the application is approved.

4) An automatic retry is made according to a first period through the mobile terminal or the intelligent electricity monitoring and metering terminal (other execution main bodies are also appropriate and there are no limits thereto in the embodiment of the disclosure) to request the regional coordination control apparatus or the server to adjust and increase the capacity allocated for the user sub-region, i.e., in some scenarios, it is appropriate that when determining that the user needs to apply for the additional allocation capacity repeatedly (for example, the user sets to retry automatically), the system applies for the additional allocation capacity automatically and repeatedly instead of the manual retry.

5) Time is appointed in advance through the mobile terminal, and when appointment time arrives, the regional coordination control apparatus or the server is requested to adjust and increase the capacity allocated for the user sub-region, or when the appointment time arrives, a capacity reserved for the user sub-region and meeting a capacity adjustment and increase request is acquired, i.e., the user may apply for the additional allocation capacity in a manner of appointing the time, for example, the system automatically applies for the additional allocation capacity at the appointment time, or the system reserves a capacity meets the additional allocation capacity applied by the user for allocating at the appointment time.

Further, when the total regions have an overload, or the total regions have an insufficient capacity balance, the additional allocation capacity acquired by the capacity adjustment and increase request is withdrawn through the regional coordination control apparatus or the server; or, the additional allocation capacity acquired by the capacity adjustment and increase request is actively withdrawn through the intelligent electricity monitoring and metering terminal.

The following technical solutions in the embodiment of the disclosure further provide several technical solutions for withdrawing the additional allocation capacity acquired by the capacity adjustment and increase request.

1) A withdrawing instruction sent by the regional coordination control apparatus or the server is received by the intelligent electricity monitoring and metering terminal; and under the indication of the withdrawing instruction, the additional allocation capacity acquired by the capacity adjustment and increase request is withdrawn, i.e., when the regional load is overhigh or the capacity balance is insufficient, the regional coordination control apparatus or the cloud server sends the capacity withdrawing instruction to the intelligent electricity monitoring and metering terminal, and the intelligent electricity monitoring and metering terminal withdraws the previously-applied additional allocation capacity within a certain time (the capacity is reduced to a normal value).

2) The additional allocation capacity acquired by the capacity adjustment and increase request is withdrawn automatically on timer, i.e., the system withdraws the additional allocation capacity of the relevant terminal when a set time expires.

3) After it is detected that the load of the user sub-region is reduced to a predetermined value for predetermined time, the additional allocation capacity acquired by the capacity adjustment and increase request is withdrawn, i.e., the intelligent electricity monitoring and metering terminal withdraws the previously-applied additional allocation capacity after detecting that the load is reduced to a set value or below for a certain time (the capacity is reduced to the normal value).

4) When the appointment period expires, the additional allocation capacity acquired by the capacity adjustment and increase request is withdrawn, i.e., when the valid period expires, the system withdraws the additional allocation capacity of the relevant terminal (or the terminal automatically withdraws the additional allocation capacity).

5) Before execution of withdrawing the additional allocation capacity acquired by the capacity adjustment and increase request, a confirming to execute the withdrawing is prompted, and if yes, the operation of withdrawing the additional allocation capacity acquired by the capacity adjustment and increase request is executed, which may also be understood as before the execution of withdrawing the additional allocation capacity acquired by the capacity adjustment and increase request, whether to continuously allow a start state of the electric consumption device of the heavy load power is prompted to the user, if yes, the additional allocation capacity is not withdrawn, and if no, the operation of withdrawing the additional allocation capacity acquired by the capacity adjustment and increase request is executed.

In the embodiment of the disclosure, upon the determination that the current capacity balance is smaller than the load power of the electric consumption device to be started, the determination module 34 is further configured to: execute at least one of the following interlock manners: soft interlock: and quasi-interlock. In the soft interlock manner, when the power supply switch monitoring terminal of the electric consumption device does not acquire capacity authorization, it is forbidden to remotely control and switch on the power supply switch. In the quasi-interlock manner, when the power supply switch monitoring terminal of the electric consumption device does not acquire the capacity authorization, and when closing the power supply switch manually, the power supply switch cannot be switched on or will trip immediately after being switched on. Further, upon the determination that the current capacity balance is greater than or equal to the load power of the electric consumption device to be started, the power supply switch monitoring terminal of the electric consumption device unlocks automatically; and upon the determination that the current capacity balance is smaller than the load power of the electric consumption device to be started, the power supply switch monitoring terminal of the electric consumption device locks automatically.

Figure 4:
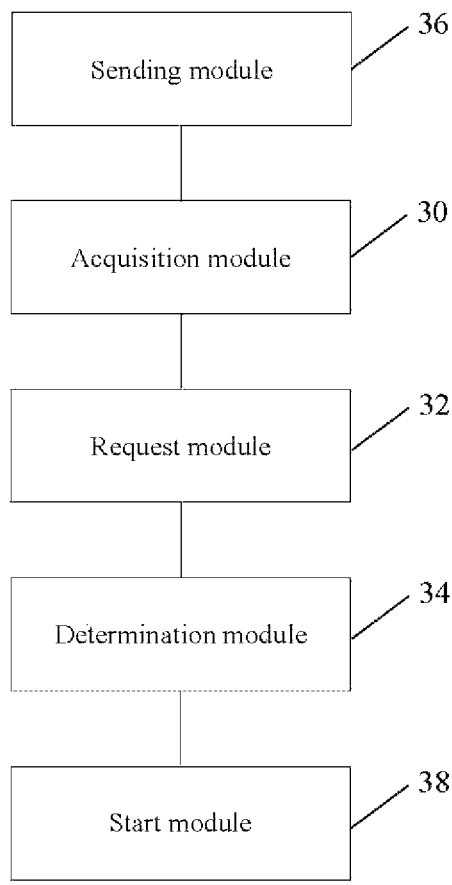
FIG. 4 is another structural block diagram of an apparatus for dynamically controlling electrical loads according to an embodiment of the disclosure.

The embodiment of the disclosure further provides technical solution for authorizing an additional allocation capacity in advance. FIG. 4 is another structural block diagram of an apparatus for dynamically controlling electrical loads according to an embodiment of the disclosure. As shown in FIG. 4, the apparatus may include: a sending module 36.

The sending module 36 is configured to at least determine, when the difference between the current total capacity limit of the total regions and the total load of the total regions is greater than or equal to the additional allocation capacity, whether to adjust and increase the capacity allocated for the user sub-region in one of the following manners: whether to adjust and increase the capacity allocated for the user sub-region is determined in real time by the regional coordination control apparatus or the server (i.e., as long as the capacity balance of the total regions is sufficient, actively, the intelligent electricity monitoring and metering terminal is authorized to acquire the additional allocation capacity); whether to adjust and increase the capacity allocated for the user sub-region is actively determined according to a load tendency and a historical load regular pattern of the total regions, and a certain margin may be kept; and whether to adjust and increase the capacity allocated for the user sub-region is determined according to a user load tendency and a historical user load regular pattern of the user sub-region, and thus when the user may need to adjust and increase the capacity, the additional allocation capacity is actively authorized.

Based on the above technical solutions, in the embodiment of the disclosure, FIG. 4 may further include a start module 38, configured to at least start the electric consumption device in one of the following manners: the power supply switch of the electric consumption device is switched on through the mobile terminal; a prompt is given through the mobile terminal to the user of switching on the power supply switch of the electric consumption device manually; and the electric consumption device is directly started through the mobile terminal.

It is to be noted that each module may be implemented by software or hardware. The latter may be implemented via the following manner but is not limited thereto: the above modules are located in the same processor; or the above modules are respectively located in different processors in any combined form.

The process for dynamically controlling electrical loads is described below in combination with the preferred embodiments but is not intended to limit the technical solutions in the embodiments of the disclosure.

According to the method for dynamically controlling the electricity and adjusting loads provided by the preferred embodiment of the disclosure, by means of mutual coordination among a handheld terminal (which equivalent to the mobile terminal in the above embodiment, and may be an Application (APP) or a Wechat official account, a mini program/applet and other user terminal devices, etc.), an intelligent electricity monitoring terminal/a smart meter (equivalent to the intelligent electricity monitoring and metering terminal in the above embodiment), an electric consumption device power supply switch monitoring terminal (equivalent to the power supply switch monitoring terminal in the above embodiment), a regional coordination control apparatus, and a cloud server (equivalent to the server in the above embodiment), the idle capacity of the region is able to be reallocated for full optimization and utilization, such that the overstandard load requirement of a special user is met dynamically within the regional power supply capacity limit, and the load of the user is guaranteed not to exceed the total capacity limit, thereby improving the resource utilization rate of power supply devices, and improving the power utilization experience of the user.

Figure 6:
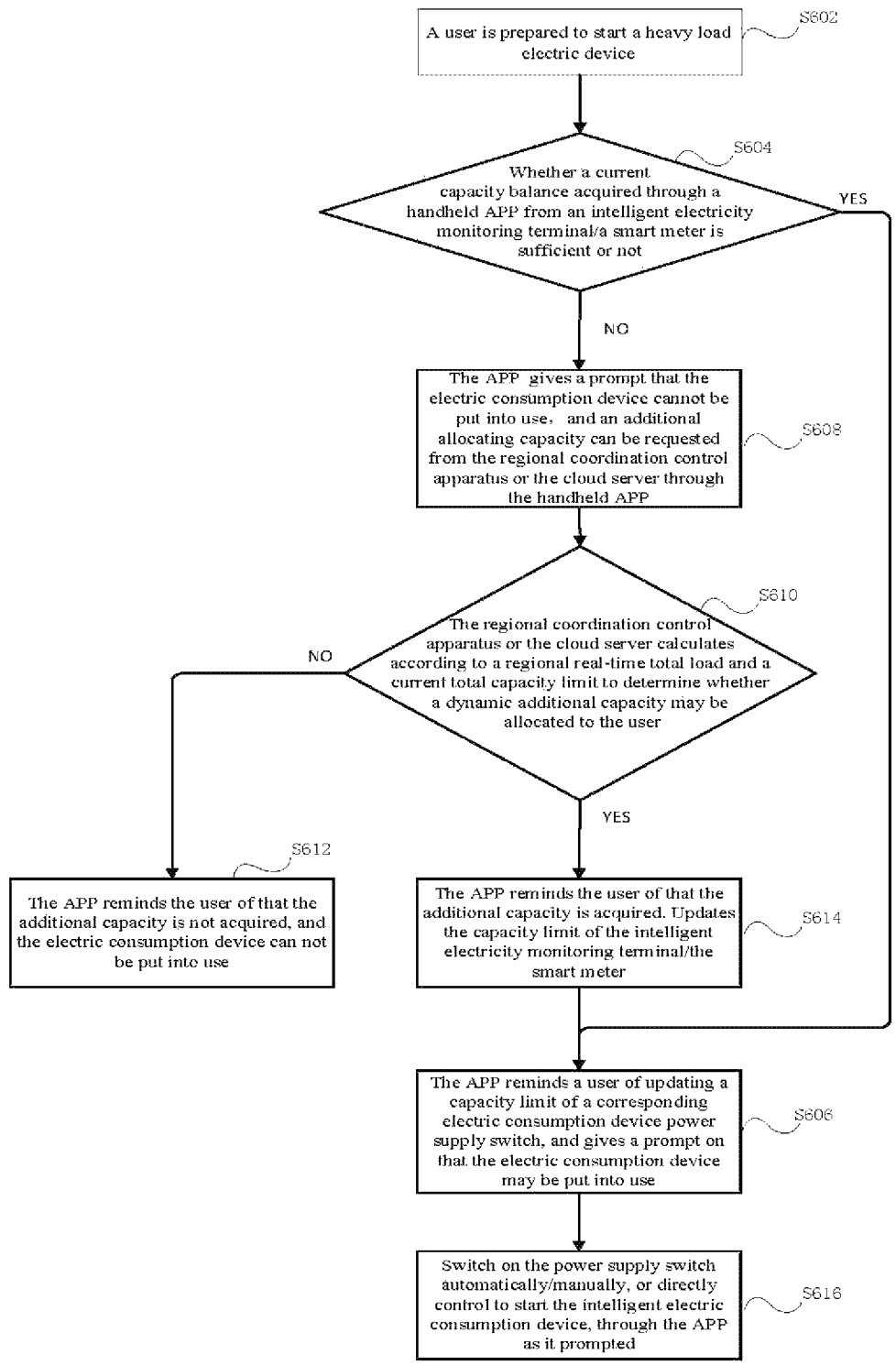
FIG. 6 is a detailed flowchart of a method for dynamically controlling electricity and adjusting loads according to a preferred embodiment of the disclosure.

Based on the above overall technical solutions, FIG. 6 is a detailed flowchart of a method for dynamically controlling electricity and adjusting loads according to a preferred embodiment of the disclosure. As shown in FIG. 6, the process may include the following steps.

At S602, a user is prepared to start a heavy load electric device.

At S604, before formally starting the heavy large electric device, the user acquires whether a current capacity balance is sufficient through a handheld APP from an intelligent electricity monitoring terminal/a smart meter (the current capacity balance may be acquired by subtracting a total load from a current capacity limit); when the capacity balance is sufficient, step S606 is executed; and when the capacity balance is insufficient, step S608 is executed.

At S606, in a case where the electric consumption device may be put into use, a power supply switch of the electric consumption device acquires a corresponding capacity limit (it may be indicated by an indicator lamp), and an intelligent electric consumption device is switched on automatically/manually through an APP, or is directly controlled to start.

At S608, in a case where the electric consumption device cannot be put into use, a capacity allocated for the power supply switch is withdrawn (the electric consumption device will trip immediately if switched on manually or started forcibly).

At this time, the mobile phone APP gives a prompt that the capacity is insufficient and is to be adjusted and increased in capacity, and notifies the intelligent electricity monitoring terminal/the smart meter of requesting the regional coordination control apparatus or directly requesting the cloud server (the cloud server collects and acquires a total load and capacity limit data of total regions in real time) to distribute an additional allocation capacity, thereby increasing the capacity dynamically: the total capacity allocated for the user is adjusted and accelerated and may reach a maximum allowable capacity limit of the master switch circuit of the user (i.e., the adjustment capacity limit) to the greatest extent.

At S610, the regional coordination control apparatus or the cloud server calculates with a regional real-time total load and a current total capacity limit as to determine whether a dynamic capacity increasing limit may be distributed to the user; if yes, step S614 is executed; if not, step S612 is executed; and a reply is made to the intelligent electricity monitoring terminal/the smart meter or the mobile phone APP to ensure that the regional total load does not exceed the current total capacity limit.

At S612, after a dynamic capacity increasing request of the user is refused, the intelligent electricity monitoring terminal/the smart meter maintains an original capacity limit, and the electric consumption device cannot be put into use. In the preferred implementation of the disclosure, after the dynamic capacity increasing request of the user is refused, the regional coordination control apparatus or the server may further be requested through the mobile terminal to adjust and increase the capacity allocated for the user sub-region.

1) When the current capacity balance is insufficient, the regional coordination control apparatus or the server is applied through the mobile terminal automatically in real time to adjust and increase the capacity allocated for the user sub-region, i.e., as long as determining that the current capacity balance is not sufficient to the load power of the electric device, the mobile terminal automatically applies to the regional coordination control apparatus or the server in real time, that is, the mobile terminal determines, in real time, whether the current capacity balance is insufficient (the total load of the user is overloaded or trends to be overloaded or is to be overloaded once the electric consumption device is started), and the additional allocation capacity is automatically applied for, to the regional coordination control apparatus or the cloud server without manual intervention.

2) A prompt on whether to apply is given through the mobile terminal, and upon the receipt of a confirmative instruction, the regional coordination control apparatus or the server is requested through the mobile terminal to adjust and increase the capacity allocated for the user sub-region, i.e., upon the determination that the user needs to apply for adjusting and increasing the capacity, the system gives a prompt to the user on whether to apply for the additional allocation capacity, and the regional coordination control apparatus or the server is applied for the additional allocation capacity after manual intervened confirmation.

3) A manual retry is made through the mobile terminal to request, the regional coordination control apparatus or the server to adjust and increase the capacity allocated for the user sub-region, i.e., if the application is refused by the regional coordination control apparatus or the server (for example, the remaining capacity of the region at the present moment is insufficient to start the electric device), the user may manually retry the application (for multiple times) in different time (or after some electric devices are closed), till the remaining capacity of the user or the region is sufficient and the application is approved.

4) An automatic retry is made according to a first period through the mobile terminal or the intelligent electricity monitoring and metering terminal (other execution main bodies are also appropriate and there are no limits thereto in the embodiment of the disclosure) to request the regional coordination control apparatus or the server to adjust and increase the capacity allocated for the user sub-region, i.e., in some scenarios, it is appropriate that when determining that the user needs to apply for the additional allocation capacity repeatedly (for example, the user sets to retry automatically), the system applies for the additional allocation capacity automatically and repeatedly instead of the manual retry.

5) Time is appointed in advance through the mobile terminal, and when appointment time arrives, the regional coordination control apparatus or the server is requested to adjust and increase the capacity allocated for the user sub-region, or when the appointment time arrives, a capacity reserved for the user sub-region and meeting a capacity adjustment and increase request is acquired, i.e., the user may apply for the additional allocation capacity in a manner of appointing the time, for example, the system automatically applies for the additional allocation capacity at the appointment time, or the system reserves a capacity meets the additional allocation capacity applied by the user for allocating at the appointment time.

At S614, after acquiring an adjusted and increased capacity of the regional coordination control apparatus or the server, the intelligent electricity monitoring terminal/the smart meter notifies the mobile phone APP, updates the capacity limit of the corresponding electric consumption device power supply switch when the capacity balance is sufficient, and prompts of putting the device into use; or, the subsequent technical solution is not, clearly illustrated in FIG. 6. After acquiring the adjusted and increased capacity of the regional coordination control apparatus or the server, the mobile phone APP first notifies the intelligent electricity monitoring terminal/the smart meter of updating the capacity, limit and to update the capacity limit of the corresponding electric consumption device power supply switch, and then prompts of putting the device into use.

At S616, the intelligent electric consumption device is switched on automatically/manually through the APP, or is directly controlled to start.

In case of a real-time communication condition among the intelligent electricity monitoring terminal/the smart meter, the electric consumption device power supply switch monitoring terminal and the regional coordination control apparatus (i.e., the on-site communication condition is good), the priority is given to the direct real-time communication for allocation adjustment interaction; with the regional coordination control apparatus as the adjustment calculation and authorization device, the user is prompted through the APP; and when the direct communication condition with the regional coordination control device is insufficient, the indirect interaction may be performed through the handheld APP or even the cloud server; the cloud server may also serve as the adjustment calculation and authorization device, i.e., the APP may also directly interact with the regional coordination control apparatus or the cloud server to apply for increasing the allocation capacity; and meanwhile, the application and result information thereof are synchronously forwarded to the intelligent electricity monitoring terminal/the smart meter.

An embodiment of the disclosure further provides a storage medium. The storage medium stores a computer program, and the computer program is configured to run to execute any step in the method embodiment.

Optionally, in the embodiment, the storage medium may be configured to store a computer program for executing the following step:

At S1, a current capacity balance of a user sub-region is acquired from an intelligent electricity monitoring and metering terminal through a mobile terminal.

At S2, when the current capacity balance is smaller than a load power of an electric consumption device to be started in the user sub-region, a regional coordination control apparatus or a server is requested through the mobile terminal to adjust and increase a capacity allocated for the user sub-region, such that the capacity balance will be greater than or equal to the load power.

At S3, whether to allow to start the electric consumption device is determined according to a decision replied by the regional coordination control apparatus or the server.

Optionally, in the embodiment, the storage medium may include but not limited to: various media capable of storing the computer program such as a U disk, an ROM, an RAM, a mobile hard disk, a magnetic disk or an optical disc.

An embodiment of the disclosure further provides an electronic apparatus, which may include a memory and a processor. The memory stores a computer program, and the processor is configured to run the computer program to execute any step in the method embodiment.

Optionally, the electronic device may further include a transmission device and an input/output device, and the transmission device is connected to the processor, and the input/output device is connected to the processor.

Optionally, in the embodiment, the processor may be configured to execute the following steps through the computer program:

At S1, a current capacity balance of a user sub-region is acquired from an intelligent electricity monitoring and metering terminal through a mobile terminal.

At S2, when the current capacity balance is smaller than a load power of an electric consumption device to be started in the user sub-region, a regional coordination control apparatus or a server is requested through the mobile terminal to adjust and increase a capacity allocated for the user sub-region, such that the capacity balance will be greater than or equal to the load power.

At S3, whether to allow to start the electric consumption device is determined according to a decision replied by the regional coordination control apparatus or the server.

Optionally, the specific example in this embodiment may be referred to the examples described in the above embodiments and optional implementation manners, and will no longer be repeated herein.

It is apparent that those skilled in the art should understand that the modules or steps of the disclosure may be implemented by a general-purpose computing device and centralized in a single computing device or distributed over a network consisting of a plurality of computing devices. Optionally, they may be implemented by a program code executable by a computing device, so that they may be stored in a storage device and executed by the computing device. Moreover, they may be different from the steps illustrated or described herein in some cases, or implemented by respectively fabricating them into respective integrated circuit modules or by fabricating a plurality of modules or steps of them into a single integrated circuit module. As such, the disclosure is not limited to any particular combination of hardware and software.

The above are only the preferred embodiments of the disclosure, not intended to limit the disclosure. As will occur to those skilled in the art, the disclosure is susceptible to various modifications and changes. Any modifications, equivalent replacements, improvements and the like made within the principle of the disclosure shall fall within the scope of protection of the disclosure.

INDUSTRIAL APPLICABILITY

Based on the technical solutions of the disclosure, when the current capacity balance of the user sub-region is smaller than the load power of the electric consumption device to be started in the user sub-region, the regional coordination control apparatus or the server is requested through the mobile terminal to adjust and increase the capacity allocated for the user sub-region, such that a capacity balance will be greater than or equal to the load power, and thus whether to allow to start the electric consumption device is determined according to the decision replied by the regional coordination control apparatus or the server. With the adoption of the above technical solutions, the problems that the regional electricity control method has low utilization rate of power supply devices and low power consumption efficiency, is prone to overload trip and the like in the relevant art are solved; and for the electric consumption device of which the current capacity balance cannot meet the load power, the regional coordination control apparatus or the server is able to be flexibly requested through the mobile terminal to adjust and increase the capacity allocated for the user sub-region, such that the capacity balance will be greater than or equal to the load power, thereby improving the power consumption efficiency and avoiding the overload trip.

What is claimed is:

1. A method for dynamically controlling electrical loads, comprising:
   acquiring a current capacity balance of a user sub-region from an intelligent electricity monitoring and metering terminal through a mobile terminal;
   when the current capacity balance is smaller than a load power of an electric consumption device to be started in the user sub-region, requesting, through the mobile terminal, a regional coordination control apparatus or a server to adjust and increase a capacity allocated for the user sub-region, such that a capacity balance will be greater than or equal to the load power; and
   determining whether to allow to start the electric consumption device according to a decision replied by the regional coordination control apparatus or the server,
   wherein requesting, through the mobile terminal, the regional coordination control apparatus or the server to adjust and increase the capacity allocated for the user sub-region, such that a capacity balance will be greater than or equal to the load power comprises:
   sending a request for requesting to adjust and increase the capacity allocated for the user sub-region to the regional coordination control apparatus or the server through the mobile terminal, so as to request to acquire an additional allocation capacity for the user sub-region; and
   receiving a decision determined by the regional coordination control apparatus or the server in the following manner: the regional coordination control apparatus or the server determines whether to increase the capacity allocated for the user sub-region according to a difference between a current total capacity limit of total regions and a total load of the total regions, wherein when the difference between the current total capacity limit and the total load is greater than or equal to the additional allocation capacity, the regional coordination control apparatus or the server is able to adjust and increase the capacity allocated for the user sub-region, and when the difference between the current total capacity limit and the total load is smaller than the additional allocation capacity, the regional coordination control apparatus or the server is not able to adjust and increase the capacity allocated for the user sub-region, or
   wherein requesting, through the mobile terminal, the regional coordination control apparatus or the server to adjust and increase the capacity allocated for the user sub-region, such that a capacity balance will be greater than or equal to the load power further comprises:
   notifying, through the mobile terminal, the intelligent electricity monitoring and metering terminal to request the regional coordination control apparatus or the server to adjust and increase the capacity allocated for the user sub-region; or the intelligent electricity monitoring and metering terminal actively requesting the regional coordination control apparatus or the server to adjust and increase the capacity allocated for the user sub-region when the intelligent electricity monitoring and metering terminal detects that a load is out-of-limit or trends to be out-of-limit.

2. The method as claimed in claim 1, wherein determining whether to allow to start the electric consumption device according to the decision replied by the regional coordination control apparatus or the server comprises:
   when the decision indicates that an additional allocation capacity for adjusting and increasing the capacity is acquired for the user sub-region, allowing to start the electric consumption device; and when the decision indicates that the additional allocation capacity for adjusting and increasing the capacity is not acquired for the user sub-region, forbidding to start the electric consumption device.

3. The method as claimed in claim 2, before starting the electric consumption device, further comprising:

updating a capacity limit of a power supply switch monitoring terminal of the electric consumption device and then giving a prompt to start the electric consumption device; or after acquiring the additional allocation capacity for adjusting and increasing the capacity from the regional coordination control apparatus or the server, notifying the intelligent electricity monitoring and metering terminal of updating a capacity limit of the user sub-region, and updating the capacity limit of the power supply switch monitoring terminal of the electric consumption device, and then giving the prompt to start the electric consumption device.

4. The method as claimed in claim 1, wherein the regional coordination control apparatus or the server is requested through the mobile terminal in at least one of the following manners to adjust and increase the capacity allocated for the user sub-region:

when the current capacity balance is insufficient, automatically requesting, in real time through the mobile terminal, the regional coordination control apparatus or the server to adjust and increase the capacity allocated for the user sub-region;

giving a prompt through the mobile terminal on whether to request, and upon the receipt of a confirmative instruction, requesting, through the mobile terminal, the regional coordination control apparatus or the server to adjust and increase the capacity allocated for the user sub-region;

making a manual retry through the mobile terminal to request the regional coordination control apparatus or the server to adjust and increase the capacity allocated for the user sub-region;

making an automatic retry according to a first period to request the regional coordination control apparatus or the server to adjust and increase the capacity allocated for the user sub-region; and appointing time through the mobile terminal in advance, and when the appointment time arrives, requesting, through the mobile terminal, the regional coordination control apparatus or the server to adjust and increase the capacity allocated for the user sub-region, or when the appointment time arrives, acquiring an additional allocation capacity that is reserved for the user sub-region and satisfies a capacity adjustment and increase request.

5. The method as claimed in claim 1, further comprising:

when the total regions have an overload, or the total regions have an insufficient capacity balance, withdrawing, through the regional coordination control apparatus or the server, the additional allocation capacity acquired by a capacity adjustment and increase request; or actively withdrawing, through the intelligent electricity monitoring and metering terminal, the additional allocation capacity acquired by a capacity adjustment and increase request.

6. The method as claimed in claim 5, wherein the additional allocation capacity acquired by the capacity adjustment and increase request is withdrawn in at least one of the following manners:

receiving, through the intelligent electricity monitoring and metering terminal, a withdrawing instruction sent by the regional coordination control apparatus or the server, and under the indication of the withdrawing instruction, withdrawing the additional allocation capacity acquired by the capacity adjustment and increase request;

automatically withdrawing the additional allocation capacity acquired by the capacity adjustment and increase request when a set time expires when detecting that a load of the user sub-region is reduced to a predetermined value for more than a predetermined time, withdrawing the additional allocation capacity acquired by the capacity adjustment and increase request;

when an appointment period expires, withdrawing the additional allocation capacity acquired by the capacity adjustment and increase request; and before execution of withdrawing the additional allocation capacity acquired by the capacity adjustment and increase request, giving a prompt on whether to confirm execution of a withdrawing operation, and if the execution of the withdrawing operation is confirmed, executing the operation of withdrawing the additional allocation capacity acquired by the capacity adjustment and increase request.

7. The method as claimed in claim 1, when determining that the current capacity balance is smaller than the load power of the electric consumption device to be started, further comprising: executing at least one of the following interlock manners:

soft interlock; and quasi-interlock, wherein in the soft interlock manner, when a power supply switch monitoring terminal of the electric consumption device does not acquire capacity authorization, remotely controlling and switching on the power supply switch is forbidden; and in the quasi-interlock manner, when the power supply switch monitoring terminal of the electric consumption device does not acquire the capacity authorization, and when closing the power supply switch manually, the power supply switch is not able to be switched on or will trip immediately after being switched on.

8. The method as claimed in claim 7, further comprising:

upon the determination that the current capacity balance is greater than or equal to the load power of the electric consumption device to be started, automatically unlocking the power supply switch monitoring terminal of the electric consumption device; and upon the determination that the current capacity balance is smaller than the load power of the electric consumption device to be started, automatically locking the power supply switch monitoring terminal of the electric consumption device.

9. The method as claimed in claim 1, further comprising:

when the difference between the current total capacity limit of the total regions and the total load of the total regions is greater than or equal to the additional allocation capacity, determining whether to adjust and increase the capacity allocated for the user sub-region in one of the following manners: determining in real time by the regional coordination control apparatus or the server; determining according to a load tendency and a historical load regular pattern of the total regions; determining according to a tendency of user load and a historical regular pattern of the user load in the user sub-region; and determining according to a capacity margin reserved for the total regions.

10. The method as claimed in claim 1, further comprising:
upon the determination that the current capacity balance is greater than or equal to the load power of the electric consumption device to be started, allowing to start the electric consumption device.

11. The method as claimed in claim 1, wherein the electric consumption device is started in at least one of the following manners:
switching on a power supply switch of the electric consumption device through the mobile terminal;
giving a prompt through the mobile terminal to a user to manually switch on the power supply switch of the electric consumption device; and
directly starting the electric consumption device through the mobile terminal.

12. The method as claimed in claim 1, further comprising:
identifying a current power transmission path of a controllable electrical device;
acquiring an available power resource of power supply and distribution devices on the power transmission path, the available power resource being at least configured to indicate one of the followings: a capacity balance of the power supply and distribution devices, and a distributable power range of the power supply and distribution devices; and
determining a control boundary of the controllable electrical device according to the available power resource.

13. The method as claimed in claim 12, wherein identifying the current power transmission path of the controllable electrical device comprises:
acquiring a topological structure of a regional electrical system diagram corresponding to the controllable electrical device, and/or a power flow direction of the controllable electrical device; and
determining the power transmission path according to the topological structure and/or the power flow direction.

14. The method as claimed in claim 12, wherein determining the control boundary of the controllable electrical device according to the available power resource comprises:
in a case where the available power resource indicates the capacity balance, determining an upper limit of an increasable load of the controllable electrical device according to the capacity balance; and
in a case where the available power resource indicates the distributable power range, determining a range of an adjustable load of the controllable electrical device according to the distributable power range.

15. The method as claimed in claim 14, wherein determining the upper limit of the increasable load of the controllable electrical device according to the capacity balance comprises:
acquiring a minimum capacity balance in multiple capacity balances of multiple power supply and distribution devices; and
determining the minimum capacity balance as the upper limit of the increasable load of the controllable electrical device.

16. The method as claimed in claim 14, wherein determining the adjustment range of the adjustable load of the controllable electrical device according to the distributable power range comprises:
acquiring multiple distributable power ranges of multiple power supply and distribution devices; and
determining a power range corresponding to an intersection of the multiple distributable power ranges as the range of the adjustable load of the controllable electrical device.

17. He method as claimed in claim 12, wherein acquiring the available power resource of the power supply and distribution device on the power transmission path comprises:
determining the available power resource according to power supply and distribution capacity and current loads of the power supply and distribution devices, the power supply and distribution capacity of the power supply and distribution device being determined according to at least one of the followings: a rated capacity of the power supply and distribution device, a rated current, a voltage, a setting value of power relay protection, a power consumption control target value from superior power dispatch center, a dynamic load control limit, and a load operation range set by a user.

18. An apparatus for dynamically controlling electrical loads, comprising:
an acquisition module, configured to acquire a current capacity balance of a user sub-region from an intelligent electricity monitoring and metering terminal through a mobile terminal;
a request module, configured to request, when the current capacity balance is smaller than a load power of an electric consumption device to be started in the user sub-region, through the mobile terminal a regional coordination control apparatus or a server to adjust and increase a capacity allocated for the user sub-region, such that a capacity balance will be greater than or equal to the load power; and
a determination module, configured to determine whether to allow to start the electric consumption device according to a decision replied by the regional coordination control apparatus or the server, wherein the request module is further configured to send a request for requesting to adjust and increase the capacity allocated for the user sub-region to the regional coordination control apparatus or the server through the mobile terminal, so as to request to acquire an additional allocation capacity for the user sub-region; and receive a decision determined by the regional coordination control apparatus or the server in the following manner: the regional coordination control apparatus or the server determines whether to increase the capacity allocated for the user sub-region according to a difference between a current total capacity limit of total regions and a total load of the total regions, wherein when the difference between the current total capacity limit and the total load is greater than or equal to the additional allocation capacity, the regional coordination control apparatus or the server is able to adjust and increase the capacity allocated for the user sub-region, and when the difference between the current total capacity limit and the total load is smaller than the additional allocation capacity, the regional coordination control apparatus or the server is not able to adjust and increase the capacity allocated for the user sub-region, or
the request module is further configured to notify the intelligent electricity monitoring through the mobile terminal and meter terminal to request the regional coordination control apparatus or the server to adjust and increase the capacity allocated for the user sub-region; or the intelligent electricity monitoring and metering terminal actively requesting the regional coordination control apparatus or the server to adjust and increase the capacity allocated for the user sub-region when the intelligent electricity monitoring and metering terminal detects that a load is out-of-limit or trends to be out-of-limit.

19. The apparatus as claimed in claim 18, wherein the determination module is further configured to allow to start the electric consumption device when the decision indicates that an additional allocation capacity for adjusting and increasing the capacity is acquired for the user sub-region; and forbid to start the electric consumption device when the decision indicates that the additional allocation capacity for adjusting and increasing the capacity is not acquired for the user sub-region.

20. A non-transitory tangible storage medium, storing, a computer program, wherein the computer program is configured to execute the method as claimed in any one of claim 1.

21. An electronic apparatus, comprising a memory and a processor, wherein a computer program is stored in the memory, and the processor is configured to run the computer program to execute the method as claimed in any one of claim 1.

* * * * *